United States Patent
Battle et al.

(10) Patent No.: US 11,768,684 B2
(45) Date of Patent: Sep. 26, 2023

(54) COMPACTION OF ARCHITECTED REGISTERS IN A SIMULTANEOUS MULTITHREADING PROCESSOR

(71) Applicant: International Business Machines Corporation, Armonk, NY (US)

(72) Inventors: Steven J. Battle, Philadelphia, PA (US); Dung Q. Nguyen, Austin, TX (US); Albert J. Van Norstrand, Jr., Round Rock, TX (US); Tu-An T. Nguyen, Austin, TX (US); Cliff Kucharski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 17/004,573

(22) Filed: Aug. 27, 2020

(65) Prior Publication Data

US 2022/0066830 A1 Mar. 3, 2022

(51) Int. Cl.
*G06F 9/30* (2018.01)

(52) U.S. Cl.
CPC ........ *G06F 9/30123* (2013.01); *G06F 9/3009* (2013.01); *G06F 9/30098* (2013.01)

(58) Field of Classification Search
CPC ............... G06F 9/3009; G06F 9/30098; G06F 9/30123; G06F 9/50; G06F 9/5077
See application file for complete search history.

(56) References Cited

U.S. PATENT DOCUMENTS

| | | | |
|---|---|---|---|
| 7,509,511 B1* | 3/2009 | Barowski | G06F 9/384 713/320 |
| 2004/0215932 A1* | 10/2004 | Burky | G06F 9/485 712/229 |
| 2010/0262967 A1* | 10/2010 | Eisen | G06F 9/485 712/220 |
| 2013/0138922 A1* | 5/2013 | Eres | G06F 9/384 712/228 |
| 2016/0092276 A1* | 3/2016 | Chu | G06F 9/3851 718/104 |
| 2018/0081684 A1 | 3/2018 | Chou et al. | |
| 2019/0146789 A1 | 5/2019 | Gschwind et al. | |
| 2019/0303163 A1 | 10/2019 | Aboud et al. | |

OTHER PUBLICATIONS

Asay, I. "Compacting Loads and Stores for Code Size Reduction." (Master's Thesis) Retrieved from https://pdfs.semanticscholar.org/4efb/68b850ba784a145242ccfdc2ebeecce882b7.pdf, Feb. 2014, 196 pgs.

(Continued)

*Primary Examiner* — David J. Huisman
(74) *Attorney, Agent, or Firm* — Robert J. Shatto (57) ABSTRACT

Disclosed is a method for rebalancing blocks of a register file. The method comprises allocating a first set of entries in a first register file to a first hardware thread of a processor core. The method further comprises allocating a second set of entries in a second register file to a second hardware thread of the processor core. The register tags in the first and second register files are compacted such that register tags associated with the first hardware thread are compacted into the first set of entries, and register tags associated with the second hardware thread are compacted into the second set of entries.

17 Claims, 9 Drawing Sheets

(56) References Cited

OTHER PUBLICATIONS

Battle et al., "Flexible Register Management using Reference Counting," In IEEE International Symposium on High-Performance Comp Architecture (pp. 1-12) Feb. 2012.

Tang et al., "Optimizing Instruction Scheduling and Register Allocation for Register-File-Connected Clustered VLIW architectures," The Scientific World Journal, vol. 2013, Article ID 913038, 2013, 12 pgs.

* cited by examiner

COMPACTION OF ARCHITECTED REGISTERS IN A SIMULTANEOUS MULTITHREADING PROCESSOR

BACKGROUND

The present disclosure relates generally to the field of computing, and more particularly to rebalancing blocks of a register file.

Simultaneous multithreading (SMT) is a technique for improving the efficiency of a computer processor using hardware multithreading by exploiting thread-level parallelism. SMT permits multiple independent execution threads to better utilize shared resources such as cache, buffers, queues, and execution units. In addition to the shared resources, each hardware thread in a processor that supports SMT has its own architected resources, including one or more sets of registers.

SUMMARY

Embodiments of the present disclosure include a method, computer program product, and system for rebalancing blocks of a register file. The method comprises allocating a first set of entries in a first register file to a first hardware thread of a processor core. The method further comprises allocating a second set of entries in a second register file to a second hardware thread of the processor core. The register tags in the first and second register files are compacted such that register tags associated with the first hardware thread are compacted into the first set of entries, and register tags associated with the second hardware thread are compacted into the second set of entries.

Further embodiments of the present disclosure include a processor and associated methods and computer program products. The processor includes one or more processor cores. The one or more processor cores comprise a first superslice and a second superslice. The first superslice comprises a first hardware thread, a third hardware thread, and a first slice target register file (STF) having a first set of STF blocks. The second superslice comprises a second hardware thread, a fourth hardware thread, and a second STF having a second set of STF blocks. The processor is configured to deactivate, in response to switching from a first simultaneous multithreading (SMT) mode to a second SMT mode, the third and fourth hardware threads. The processor is further configured to compact STF tags for the first hardware thread into a first portion of the first STF and STF tags for the second hardware thread into a second portion of the second STF. The processor is further configured to synchronize the first and second STFs such that both STFs contain the STF tags for the first and second hardware threads.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 1 illustrates a block diagram of a processor core that supports simultaneous multithreading (SMT) with four

2 hardware threads in two superslices, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to rebalancing blocks of a register file during simultaneous multithreading (SMT) mode reduction (e.g., compaction/reconfiguration). While the present disclosure is not necessarily limited to such applications, various aspects of the disclosure may be appreciated through a discussion of various examples using this context.

Each hardware thread in a processor that supports multithreading (such as SMT) has its own set of architected resources. The architected resources may include one or more sets of registers, such as general purpose registers (GPRs) and/or vector/scalar registers (VSRs). These registers may be used by the hardware threads when executing parts of an application in parallel. The use of registers allows hardware threads to simultaneously perform operations on data without interfering with other hardware threads working with the same data.

There are several modes in which an SMT processor may be run. First, the SMT processor may be run in a full SMT mode, where all hardware threads are enabled and active. For an SMT-8 processor, this means utilizing eight hardware threads per core. Similarly, an SMT-4 processor can run up to four hardware threads per core. The SMT processor may also be run in a reduced-SMT mode, where not all hardware threads are active. For example, an SMT-4 processor (e.g., a processor that supports four hardware threads per core)

may be run in SMT-2 mode (only two of the four hardware threads are active). Alternatively, an SMT processor may be run in a single-thread (ST) mode, where only a single hardware thread may be active. Regardless of whether the processor is running in a full-SMT mode, a reduced-SMT mode, or a ST mode, each hardware thread may only access its own architected resources.

Within a core, hardware threads may be divided into superslices, which are groups of slices that share some hardware. For example, an SMT-4 processor can include four hardware threads divided into two different superslices, with each superslice having the hardware and architected resources necessary for two hardware threads to operate independently from the hardware threads found in a different superslice. In other words, each superslice may operate independently from other superslices. Accordingly, each superslice may maintain its own register file. The register file holds the registers needed for various instructions being executed by the hardware threads in the superslice. In some processors, the register file may be broken up into blocks. For example, in some POWER® processors, the register file is called a Slice Target Register File (STF), and it is composed of four smaller STF blocks working together to provide the core with a large register file.

STF blocks are used by hardware threads executing instructions to store the location of architected resources used by the hardware thread's instructions. Due to how STF block consumption is handled by the processor, one STF block can be consumed more than the other STF block(s). This causes an imbalance between the STF blocks, which can cause the dispatch logic to stall when one block is completely filled up even though the other STF blocks still have room to accept instructions. For example, during thread re-configuration to move threads from SMT-4 to SMT-2 (i.e., remove two threads, and move the remaining threads to all of the STF blocks), the filled up STF block may cause the core to hang due to lack of STF entries for the registers to move between the blocks.

Throughout this disclosure, embodiments will be described with respect to an example POWER® processor being reconfigured from SMT-4 mode to SMT-2 mode. Additionally, the example POWER processor includes two superslices (superslice 0 and superslice 1) within a core, and the STF is broken into four blocks (STF0 through STF3). However, it is to be understood that this is an example processor used for illustrative purposes only, and the disclosure is not limited to POWER processors or to processors that support an SMT-4 mode. The methods, systems, processors, and program products described herein may differ significantly from the example POWER processor, and the methods described herein may be utilized to rebalance a register file during normal operation (i.e., when not reconfiguring the SMT mode). For example, embodiments of the present disclosure may be applied to non-POWER processors, to processors supporting an SMT-8 mode, and/or the STF may contain fewer or more than four blocks.

Embodiments of the present disclosure include a mechanism to compact and rebalance the STF blocks to ensure that each STF block will contain an approximately equal number of architected registers when the thread re-configuration process is completed. The compaction mechanism also ensures that different hardware threads are assigned different entries in the STFs such that the STFs can be mirrored without any collisions (i.e., without two hardware threads occupying the same entry number in different STFs). This mechanism can also be used to rebalance the STF block during normal execution of instructions if one or more STF blocks are filled up and causing the dispatch to stall.

The mechanism can be built into a mapper of the processor. The mapper is a component of a processor core that maps instructions and registers, and it is responsible for storing where data is. For example, the mapper may be configured to store register tags (also referred to herein as STF tags) that are in use by, or have been assigned to, a hardware thread in the STF. In some embodiments, the mapper may move and spread out the architected registers among the STF blocks during rebalance. When the rebalance process is completed, the STF blocks will contain approximately the same number of architected registers, and then dispatch can resume as normal.

During reconfiguration from SMT-4 to SMT-2, two hardware threads (one from each superslice) are deactivated. The mapper may then deallocate the tags associated with the deactivated hardware threads, thereby freeing them up to be used by the remaining hardware threads. The mapper may also compact the STF tags in the STF for the remaining hardware thread(s) such that the STFs from each superslice can be merged or combined together (also referred to herein as synchronized or mirrored), as may be required in ST and SMT-2 modes, without STF tags colliding. By first compacting the data for each hardware thread, collisions can be avoided during the synchronization process, thereby improving the speed of the reconfiguration process.

For example, a first superslice may contain a first hardware thread and a third hardware thread, and a second superslice may contain a second hardware thread and a fourth hardware thread. During reconfiguration to SMT-2 mode, the third and fourth hardware threads may be killed off, leaving only the first hardware thread in the first superslice and the second hardware thread in the second superslice. Accordingly, a first mapper for the first superslice may deallocate the STF tags for the third hardware thread, and a second mapper for the second superslice (which may be the same or different than the first mapper) may deallocate the STF tags for the fourth hardware thread.

Additionally, the first mapper may compact the STF tags for the first hardware thread into a section of the STF blocks of the STF of the first superslice, and the second mapper may compact the STF tags for the second hardware thread into a different, non-overlapping section of the STF blocks of the STF for the second superslice. Once the STF tags have been compacted, the STFs may be synchronized such that both the STF for the first superslice and the STF for the second superslice include the STF tags for both the first and second hardware threads.

The mapper may compact the STF tags for the active hardware threads in any fashion that ensures that the STF tags will not overlap when the STFs are synchronized. For example, as discussed in more detail below, the STF tags may be compacted horizontally (i.e., such that different hardware threads use a different set of rows, or entries, in each STF block) or vertically (i.e., such that different hardware threads use different STF blocks). In some embodiments, vertical compaction may be preferable due to it being generally easier to program. However, either vertical or horizontal compaction, or any other form of compaction otherwise consistent with this disclosure, may be utilized.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
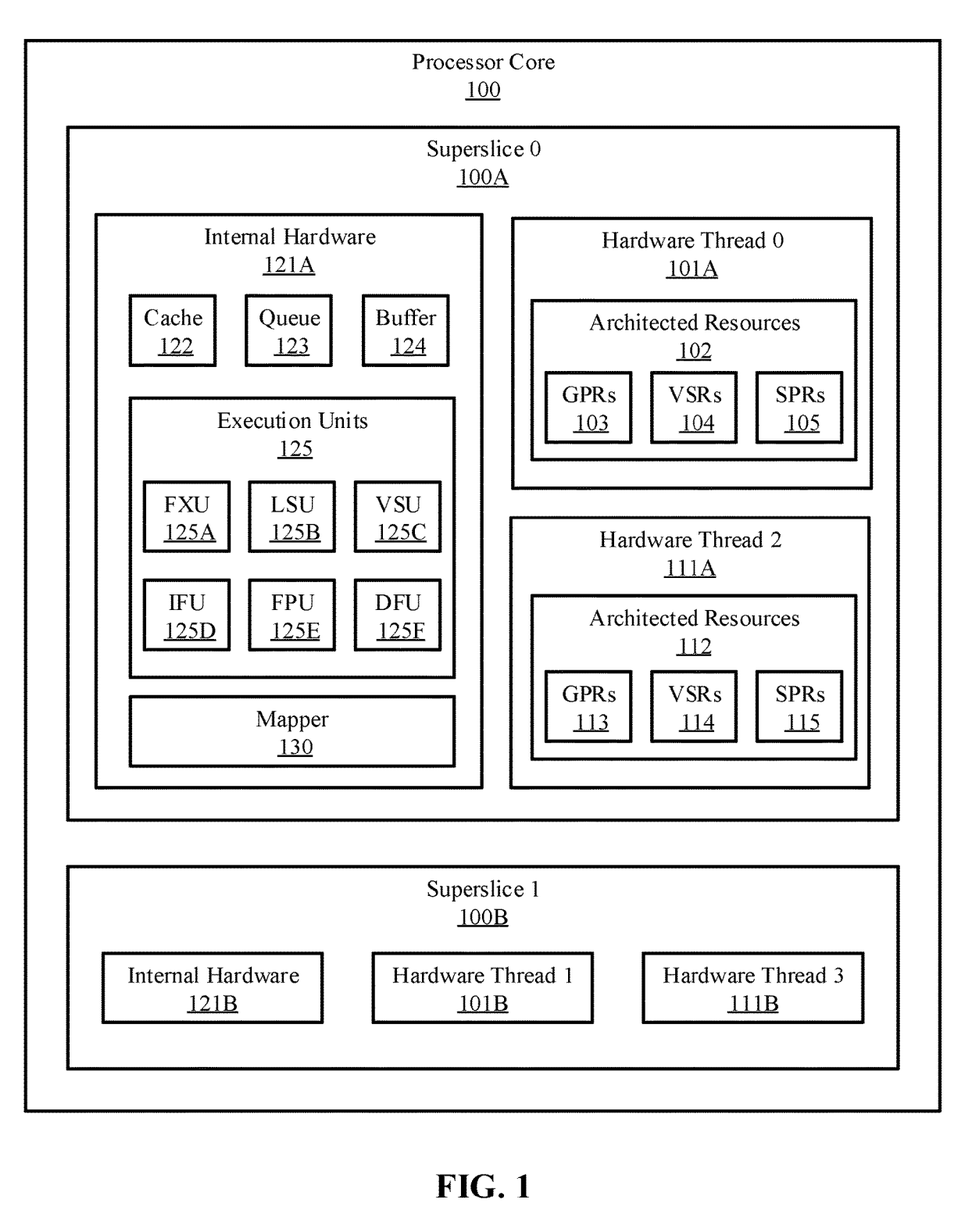

Turning now to the figures, FIG. 1 illustrates a block diagram of a processor core 100 that supports simultaneous multithreading (SMT) with four hardware threads, in accordance with embodiments of the present disclosure. In some embodiments, the processor core 100 may be part of a multi-core central processing unit (CPU). In other embodiments, the processor core 100 may be part of a single core CPU.

The processor core 100 includes two superslices 100A, 100B. The first superslice 100A (also referred to as superslice 0) may include internal hardware 121A (also referred to as micro-architecture resources) and two hardware threads 101A, 111A. Similarly, the second superslice 100B (also referred to as superslice 1) may include internal hardware 121B and two hardware threads 101B, 111B. The internal hardware 121A, 121B (collectively or individually referred to herein as internal hardware 121) may be substantially similar or the same for each superslice. Similarly, the first hardware threads 101A, 101B (collectively or individually referred to herein as first hardware thread(s) 101) and the second hardware threads 111A, 111B (collectively or individually referred to herein as second hardware thread(s) 111) in each superslice 100A, 100B may be substantially similar or the same for each superslice.

The internal hardware 121 may include execution units 125. The execution units 125 may include one or more fixed-point units (FXU) 125A, load-store units (LSU) 125B, vector/scalar unit (VSU) 125C, instruction fetch units (IFU) 125D, floating point units (FPU) 125E, and decimal floating units (DFU) 125F. In some embodiments, the processor core 100 may include other execution units, such as cryptographic units, condition register units, and/or branch register units, among others.

The internal hardware 121 may also include, for example, one or more caches 122, issue queues 123, buffers 124, and/or branch prediction units (not shown). The caches 122 may be a multi-level hierarchical caches. For example, each core in a processor (e.g., processor core 100) may have its own L1 cache. The L1 cache may be shared by all hardware threads (e.g., the first hardware thread 101 and the second hardware thread 111) within the processor core. The cores may also have access to L2 and L3 caches, which may be shared with other processor cores and/or between superslices within the same core.

The internal hardware 121 also includes a mapper 130, which is responsible for managing STF tags for the hardware threads 101, 111.

The hardware threads 101 and 111 may each have their own set of architected resources 102 and 112, respectively. The architected resources 102 and 112 may include one or more registers that are dedicated to a specific hardware thread. For example, the architected resources 102 and 112 may include one or more sets of general purpose registers (GPRs) 103 and 113, floating point registers (FPRs) 104 and 114, and special purpose registers (SPRs) 105 and 115. In some embodiments, the FPRs 104 and 114 may support storing floating point vectors. In these embodiments, the FPRs 104 and 114 may be vector/scalar registers (VSRs).

Because the processor core 100 supports SMT with four hardware threads, it may be referred to as supporting SMT-4 or being an SMT-4 processor core. While the processor core 100 illustrated in FIG. 1 is an SMT-4 processor core, other types of processor cores otherwise consistent with the present disclosure are contemplated. For example, in some embodiments an SMT-2 (two hardware threads per core) or SMT-8 (eight hardware threads per core) processor may be used in implementing one or more of the methods disclosed herein.

Figure 2A:
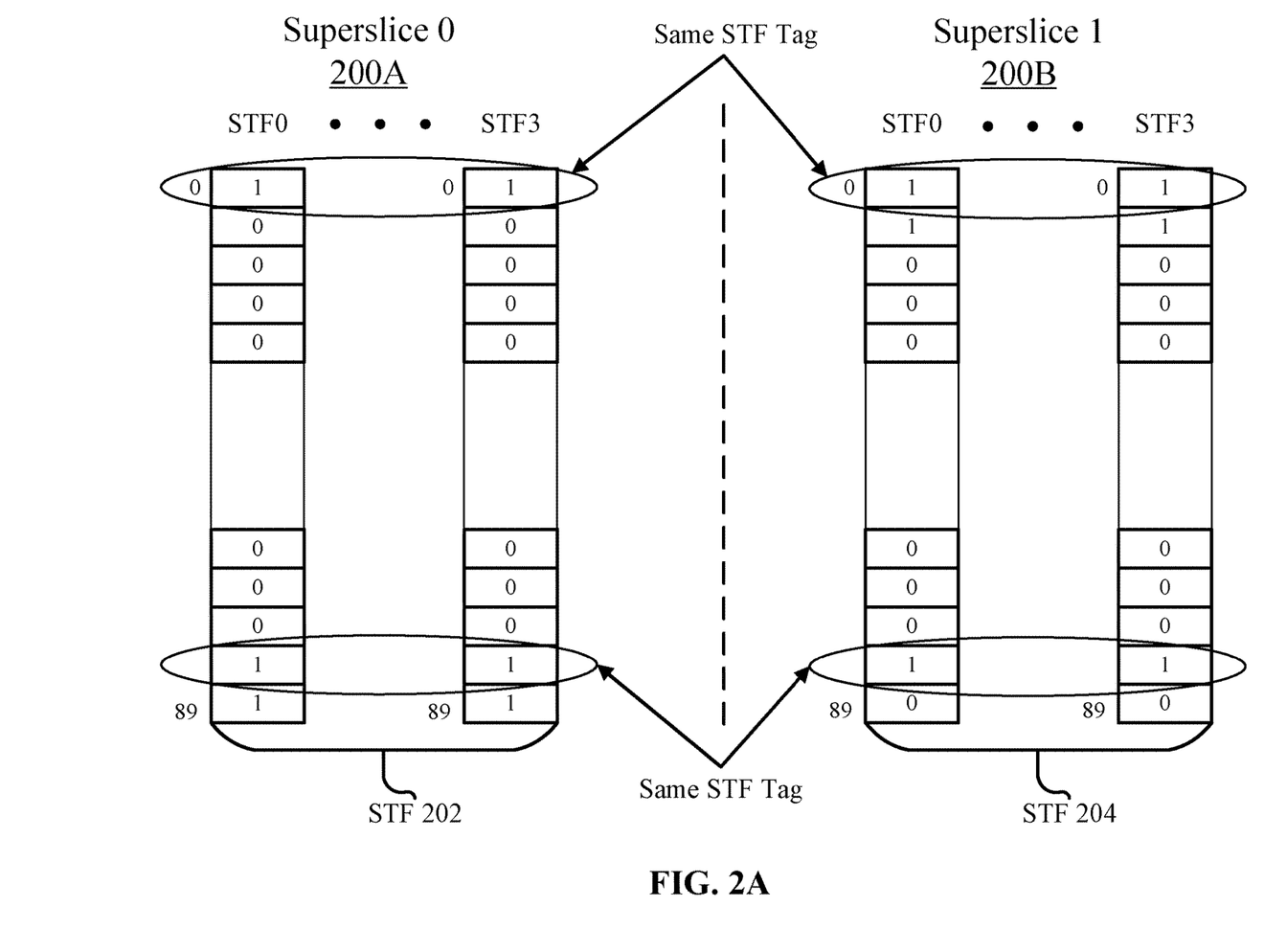
FIG. 2A illustrates an example collision that may occur when trying to synchronize a slice target register file (STF) after reducing the SMT mode of a processor, in accordance with embodiments of the present disclosure.

Referring now to FIG. 2A, illustrated is an example STF collision that may occur when trying to synchronize a slice target register file (STF) after reducing the SMT mode of a processor with two superslices 200A, 200B (collectively or individually referred to as superslice(s) 200), in accordance with embodiments of the present disclosure. Specifically, the STF collision shown in FIG. 2A may occur when a processor is being reconfigured from SMT-4 mode to SMT-2 mode.

In SMT-4 mode, each superslice 200 contains its own STF to store register data (e.g., in STF tags) pertaining to instructions handled by hardware threads within the superslice. The STFs are subdivided into four blocks STF0-STF3. Additionally, because each superslice 200 can operate independently, the STFs are independently managed by each superslice's 200 mapper. For example, in SMT-4 mode, each superslice 200 contains two hardware threads: threads 0 and 2 will reside in the first superslice 200A, while threads 1 and 3 will reside in the second superslice 200B. The mapper for the first superslice 200A allocates STF tags to each of thread 0 and thread 2 in the first STF 202, while the mapper for the second superslice 200B independently allocates STF tags to each of thread 1 and thread 3 in the second STF 204. Because each mapper independently assigns its STF tags, threads in different superslices 200 may have the same STF tags assigned to them.

When SMT-4 to SMT-2 reconfiguration occurs, two threads are killed off such that each superslice 200 only has a single thread left. This results in the mapper deallocating tags for the killed off threads (i.e., removing them from the STF and adding them back to the free list), while the STF tags of the remaining threads will still be kept in STFs 202, 204. Using the example shown in FIG. 2A, when SMT-4 to SMT-2 reconfiguration occurs, thread 2 and thread 3 are killed off, leaving thread 0 and thread 1 in the STF. The resulting STFs are shown in FIG. 2A. In other words, the first STF 202 in FIG. 2A shows the tags assigned to thread 0 (shown as "1" in the figure), while the second STF 204 in FIG. 2A shows the tags assigned to thread 1.

Unlike SMT-4, SMT-2 is not a core-split mode. This means that while a processor operating in SMT-4 mode maintains two independent STFs, the STFs have to be identical when running in SMT-2 mode. Accordingly, the core will need to synchronize the STFs by copying thread 0 STF data from the first superslice 200A to the second superslice 200B and copying thread 1 STF data from the second superslice 200B to the first superslice 200A. However, since the STF data from both superslices 200 were assigned independent from each other, the remaining STFs residing in each superslice 200 may have the same STF tag number. As shown in the example in FIG. 2A, both hardware threads have assigned STF tags at entries 0 and 88 in the STFs. Since the STF tags are the same in each superslice 200, data collision will occur when STF data is copied from one superslice to another.

Figure 2B:
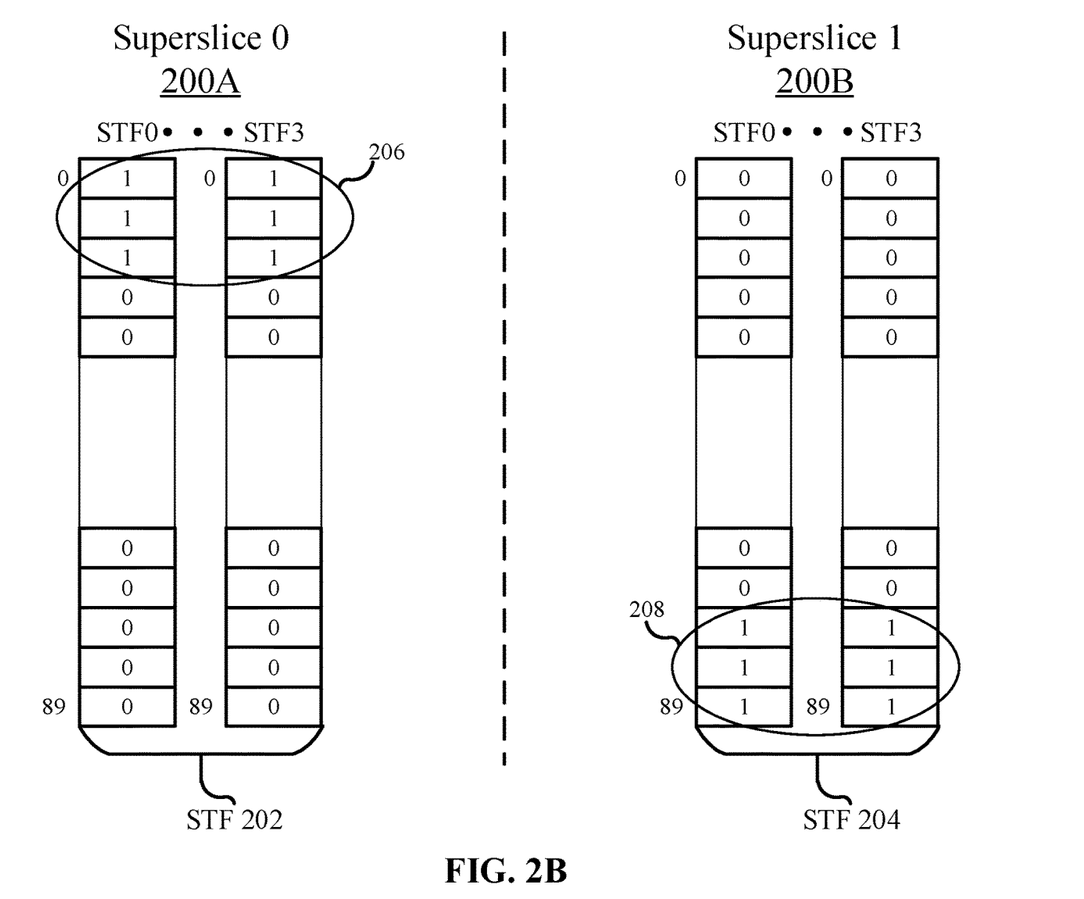
FIG. 2B illustrates an example of a horizontal compaction of the STF blocks, in accordance with embodiments of the present disclosure.

Referring now to FIG. 2B, illustrated is an example of a horizontal compaction of the STF blocks to avoid collisions during synchronization of the STFs, in accordance with embodiments of the present disclosure. Specifically, FIG. 2B illustrates the STFs of FIG. 2A after STF compaction and before synchronization.

As shown in FIG. 2B, all of the data for a first thread 206 (thread 0), which is in the first superslice 200A (superslice 0), is compacted into entries 0-25 of each STF block of the first STF 202 for superslice 0. This is indicated by the entries having a '1' in them in the first STF 202. Similarly, all of the data for a second thread 208 (thread 1), which is in the second superslice 200B (superslice 1), is compacted into entries 64-89 of each STF block of the second STF 204 for superslice 1. This is indicated by the entries having a '1' in them in the second STF 204. The remaining entries are deleted, as represented by the entries having a '0' in them.

Figure 2C:
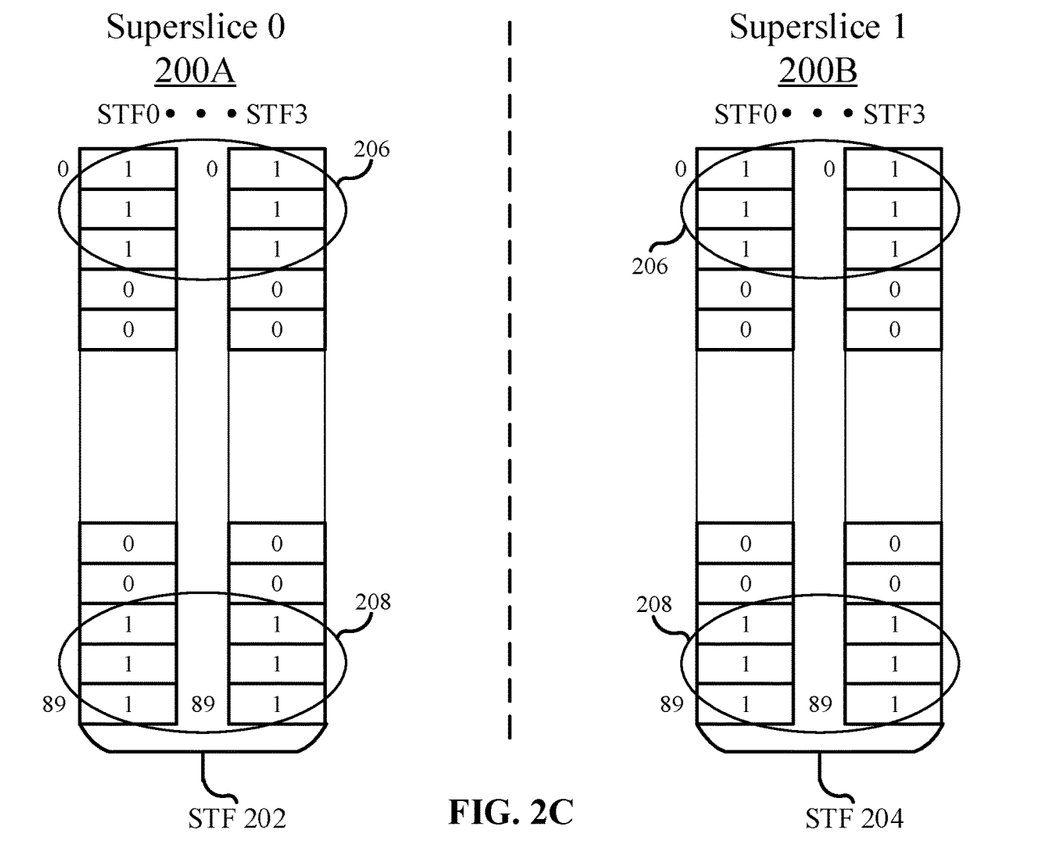
FIG. 2C illustrates an example of the STF blocks of FIG. 2B after the STF has been mirrored across the superslices, in accordance with embodiments of the present disclosure.

As shown in FIG. 2B, no entry in the first STF 202 that includes data (i.e., has a 1) has a corresponding entry in the second STF 204 that also includes data. Likewise, no entry in the second STF 204 that includes data (i.e., has a 1) has a corresponding entry in the first STF 202 that also includes data. Accordingly, as shown in FIG. 2C, the entries can be synchronized without collision such that both the first STF 202 and the second STF 204 contain the same data in corresponding locations in the STFs. In other words, after synchronizing the STFs 202, 204, the data for the first thread 206 is occupying entries 0-25 of both STFs, and the data for the second thread 206 is occupying entries 64-89.

Figure 3A:
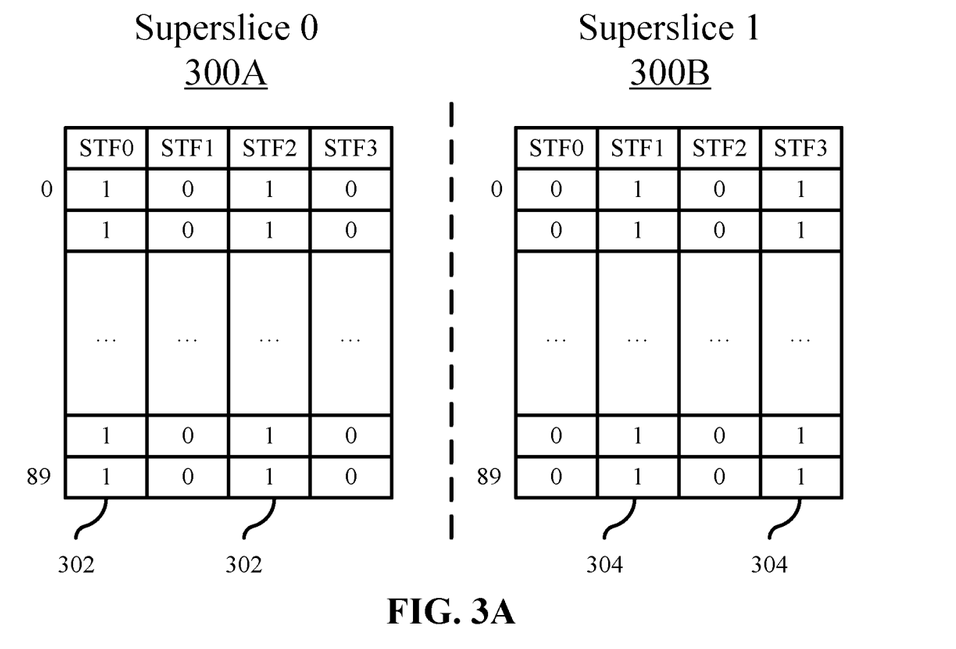
FIG. 3A illustrates an example of a vertical compaction of the STF blocks, in accordance with embodiments of the present disclosure.

Referring now to FIG. 3A, illustrated is an example of a vertical compaction of the STF blocks, in accordance with embodiments of the present disclosure. Similar to the horizontal compaction illustrated in FIGS. 2B-2C, the vertical compaction shown in FIGS. 3A-3B includes first compacting the data for a single hardware thread into a portion of the STF for each superslice (shown in FIG. 3A), and then synchronizing the STFs (shown in FIG. 3B).

Figure 3B:
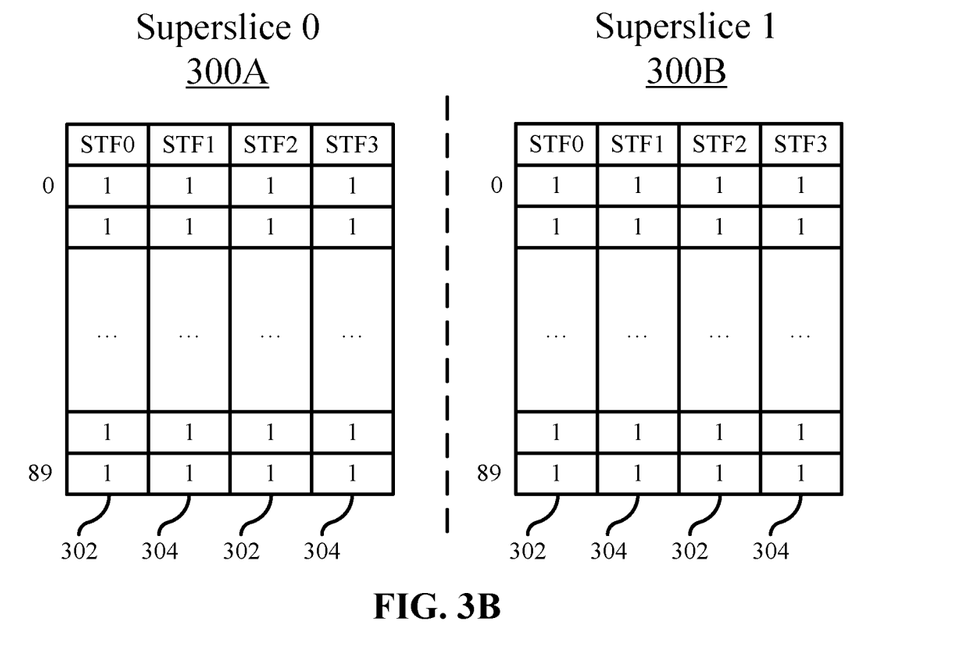
FIG. 3B illustrates an example of the STF blocks of FIG. 3A after the STF has been mirrored across the superslices, in accordance with embodiments of the present disclosure.

Whereas the horizontal compaction had each hardware thread compacted into a set of entries (e.g., 0-25) across each block of the STF, the vertical compaction shown in FIGS. 3A-3B compacts each hardware thread into specific STF blocks. For example, a first hardware thread 302 in the first superslice 300A is compacted into the first and third STF blocks (STF0, STF2), while a second hardware thread 304 in the second superslice 300B is compacted into the second and fourth STF blocks (STF1, STF3). After the threads have been compacted into their respective STF blocks, the STFs can be synchronized across superslices such that both the first superslice 300A and the second superslice 300B include the data for the first hardware thread 302 and the second hardware thread 304, as shown in FIG. 3B.

Figure 4A:
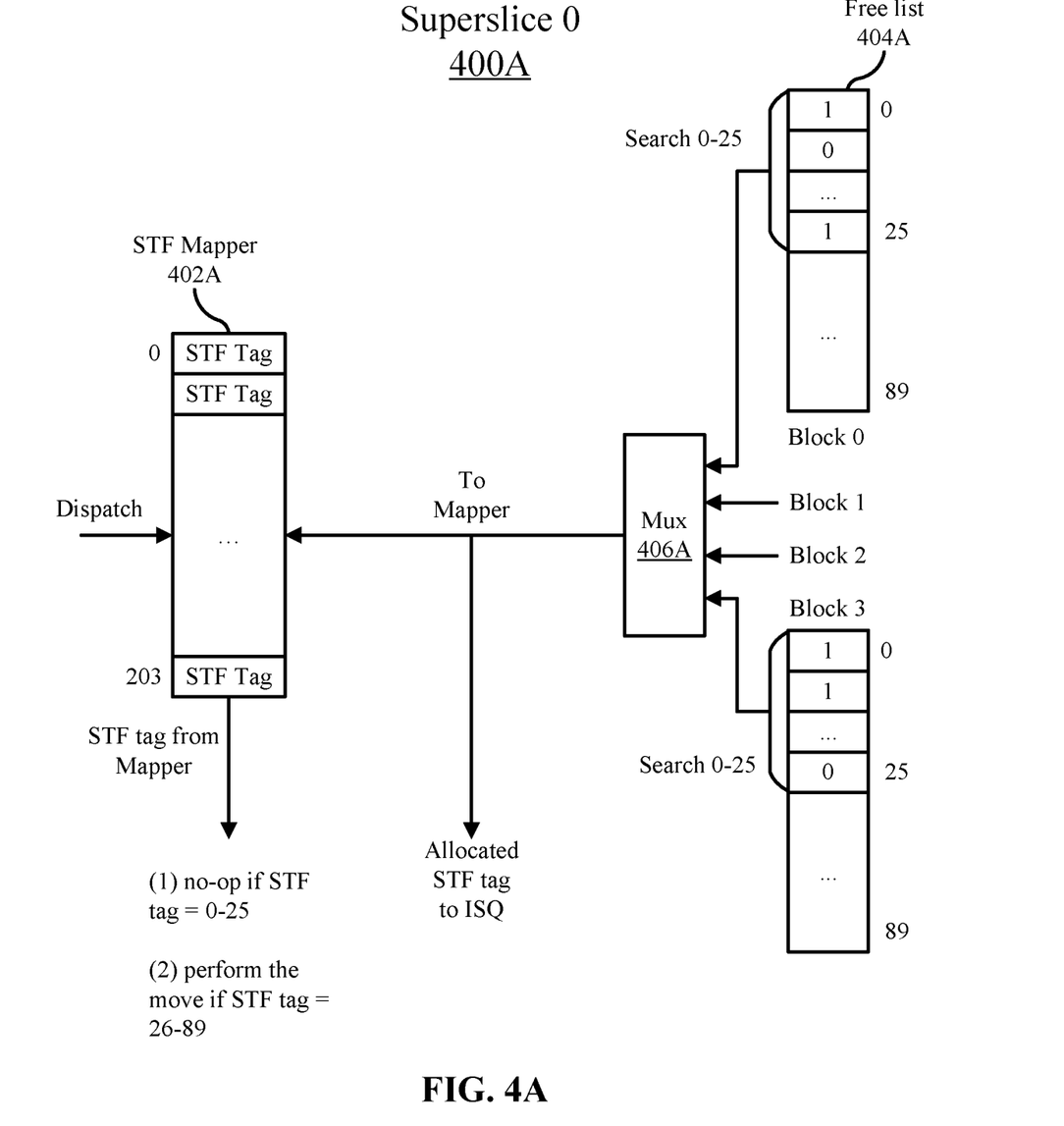
FIGS. 4A and 4B illustrate example architectures used to perform a horizontal compaction of the STF, in accordance with embodiments of the present disclosure.
Figure 4B:
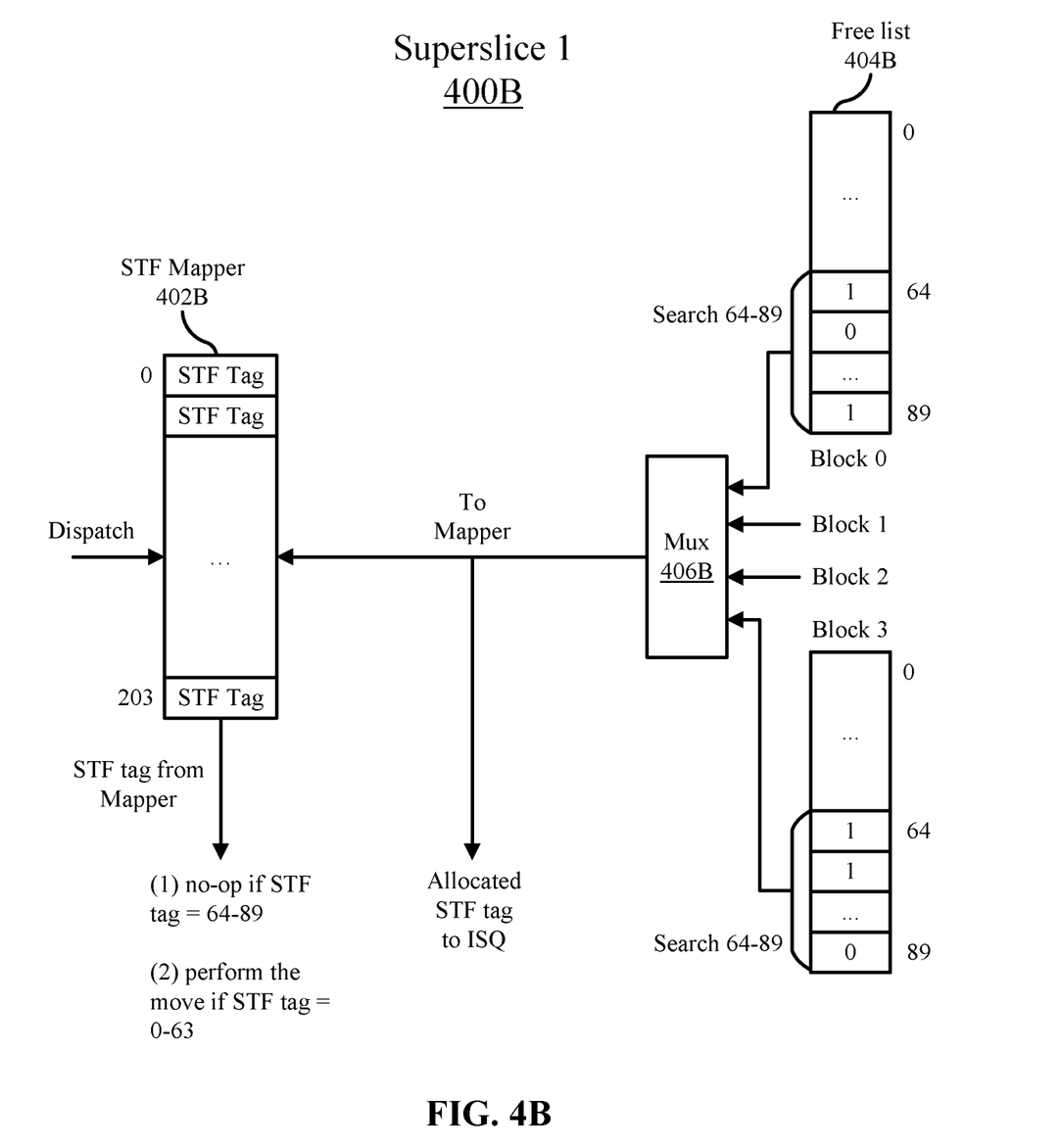

Referring now to FIGS. 4A and 4B, illustrated is an example architecture used to perform a horizontal compaction of the STF, in accordance with embodiments of the present disclosure. Specifically, FIGS. 4A and 4B illustrate an example architecture of a POWER 10 processor that has 4 STF blocks, where each block is 90 entries deep. Additionally, each thread needs 102 architected registers. For simplification, each thread in FIGS. 4A and 4B is allocated 26 architecture registers for each STF block.

Referring specifically to FIG. 4A, shown is the architecture of superslice 0 400A. Superslice 0 400A will compact all STF entries into entries 0-25 of each STF block. This is accomplished using a free list 404A, a mux 406A, and an STF mapper 402A.

At the free list, for each block, entries 0-25 are allocated to the first superslice 400A. If entries 0-25 of a block are filled up, then an entry from the next block is allocated. This is done by searching entries 0-25 for the first empty STF tag in a block (starting with Block 0). When an empty STF tag is found, the STF tag is provided to the Dispatch for the move instruction. If no entry is available in range of 0-25, then this Block is "filled," and the superslice 400A moves to the next Block to search for the next "free" STF tag.

At the Dispatch/Mapper, move instructions are used to read the mapper 402A from the top to the bottom. One mapper location is read per dispatch to access the STF tag. If the STF tag is within the range of 0-25 in the STF mapper 402A, then the move operation is dropped. This is because the data is already in an acceptable position in the STF mapper 402A. If the STF tag is not within the range of 0-25 (i.e., it is found in one of entries 26-89), then the Dispatch uses the free STF tag provided by the free list 404A and perform the move operation to move the data to a free location within the 0-25 range.

To prevent STF bloating during the moves caused by "speculative tags," the system may de-allocate the moves earlier. An issue queue (ISQ) can send the issued instruction tag (ITAG) and STF tag to the free list 404A to deallocate the old STF tag. The free list 404A can mux in the issued ITAG with the completion ITAG using the mux 406A, as shown in FIG. 4A.

Referring now to FIG. 4B, shown is the architecture of superslice 1 400B. Superslice 1 400B will compact all STF entries into entries 64-89 of each STF block. This is accomplished using a free list 404B, a mux 406B, and an STF mapper 402B. The procedure performed to compact the STF entries in superslice 1 400B is substantially similar to the procedure described with respect to FIG. 4A to compact the STF entries in superslice 0 400A At the free list, for each block, entries 64-89 are allocated to the first superslice 400A. If entries 64-89 of a block are filled up, then an entry from the next block is allocated. This is done by searching entries 64-89 for the first empty STF tag in a block (starting with Block 0). When an empty STF tag is found, the STF tag is provided to the Dispatch for the move instruction. If no entry is available in range of 64-89, then this Block is "filled," and the superslice 400B moves to the next Block to search for the next "free" STF tag.

At the Dispatch/Mapper, move instructions are used to read the mapper 402B from the top to the bottom. One mapper location is read per dispatch to access the STF tag. If the STF tag is within the range of 64-89 in the STF mapper 402B, then the move operation is dropped. This is because the data is already in an acceptable position in the STF mapper 402B. If the STF tag is not within the range of 64-89 (i.e., it is found in one of entries 0-63), then the Dispatch uses the free STF tag provided by the free list 404B and perform the move operation to move the data to a free location within the 64-89 range.

To prevent STF bloating during the moves caused by "speculative tags," the system may de-allocate the moves earlier. An issue queue (ISQ) can send the issued instruction tag (ITAG) and STF tag to the free list 404B to deallocate the old STF tag. The free list 404B can mux in the issued ITAG with the completion ITAG using the mux 406B, as shown in FIG. 4B.

Figure 5:
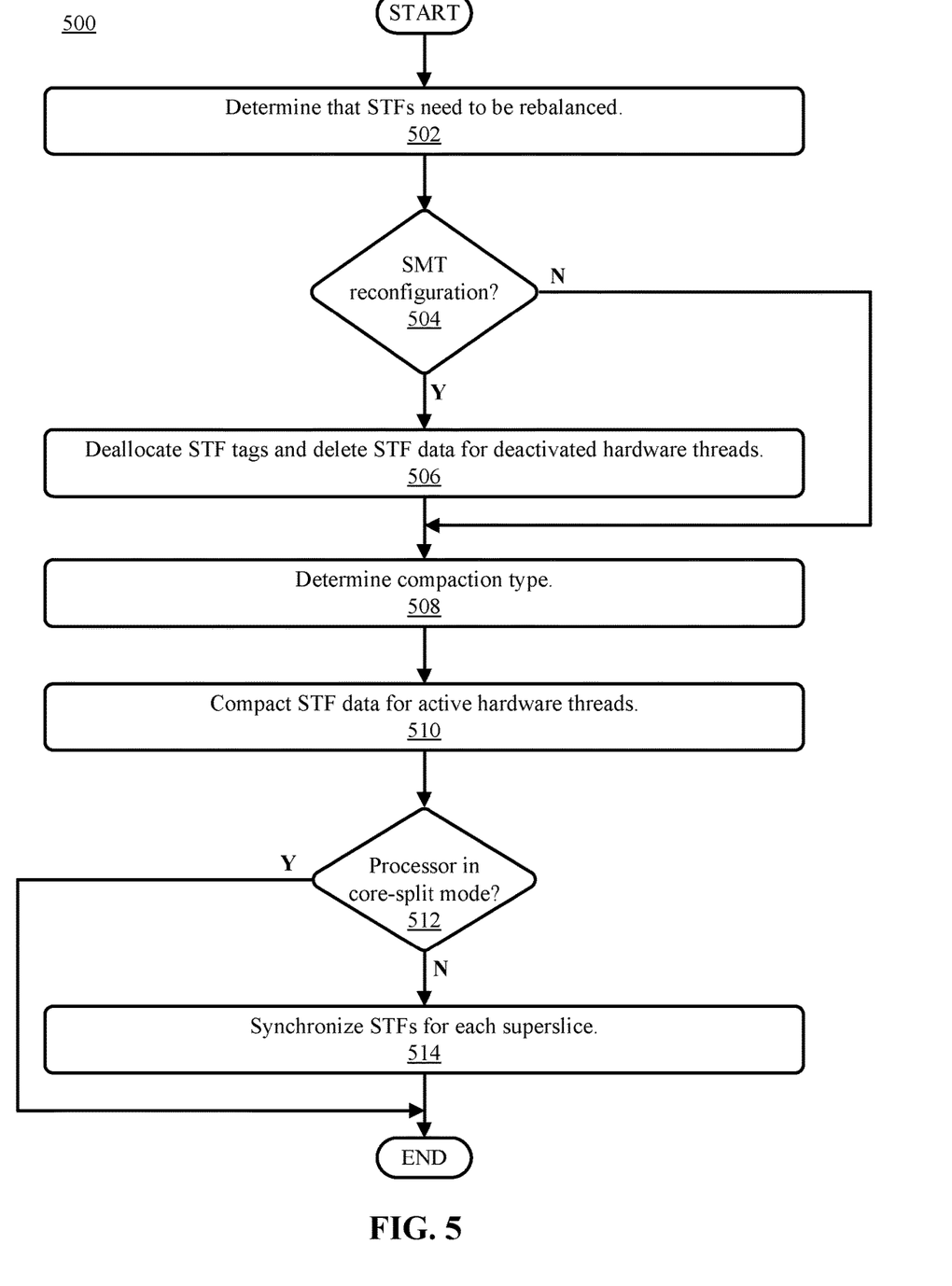
FIG. 5 illustrates a flowchart of an example method for rebalancing an STF, in accordance with embodiments of the present disclosure.

Referring now to FIG. 5, illustrated is a flowchart of an example method 500 for rebalancing an STF, in accordance with embodiments of the present disclosure. The method 500 may be performed by hardware, firmware, software executing on a processor, or any combination thereof. For example, one or more operations of the method 500 may be performed by an STF mapper (e.g., in conjunction with other hardware components). The method 500 may begin at operation 502, wherein the processor may determine that the STFs for a core need to be rebalanced.

In some embodiments, the processor may determine that the STFs need to be rebalanced based on the processor being reconfigured from one SMT mode to another SMT mode. For example, the processor may determine that the STFs need to be rebalanced when a processor is being reconfigured from SMT-4 mode to SMT-2 mode. In some embodiments, the processor may receive an instruction to reconfigure the processor core from a first simultaneous multithreading (SMT) mode to a second SMT mode.

In some embodiments, the processor may determine that the STFs need to be rebalanced even when the processor is not being reconfigured from one SMT mode to another. For example, the processor may determine that there is an imbalance in the STF block consumption. This imbalance may cause dispatch logic to stall when, for example, one STF block fills up despite other STF blocks having room for instructions. Accordingly, the processor may be configured to rebalance the STFs when the STFs become sufficiently imbalanced (e.g., using a threshold)

After determining that the STFs need to be rebalanced at operation 502, if the rebalance was triggered by an SMT reconfiguration ("Yes" at decision block 504), the processor may deallocate STF tags and delete STF data for the deactivated hardware threads at operation 506. For example, as discussed herein, an SMT reconfiguration from SMT-4 mode to SMT-2 mode involves deactivating (killing off) two hardware threads. As such, the STF tags and other data associated with the instructions executed by those hardware threads may no longer be useful and can be deleted. Additionally, the deallocated STF tags can be returned to an STF free list so that they can be allocated to the remaining, active hardware thread(s). If the rebalance was not triggered by an SMT reconfiguration ("No" at decision block 504), there are no newly deactivated hardware threads to clear out of the STF, so the method 500 proceeds directly to operation 508.

At operation 508, the processor determines the appropriate compaction type. For example, in some embodiments the processor is configured to perform a horizontal compaction, as shown in FIGS. 2B-2C. In some embodiments, the processor is configured to perform a vertical compaction, as shown in FIGS. 3A-3B. Other compaction types that are otherwise consistent with the present disclosure may also be used. For example, in some embodiments, the compaction type may be largely similar to the horizontal compaction, except that the mapper may allocate alternating rows to each hardware thread (e.g., the first hardware thread is allocated even rows in the STF, and the second hardware thread is allocated odd rows).

Additional details of the compaction process may also be determined at operation 508. For example, in a horizontal compaction, the processor may determine how many entries in each STF block to allocate to each hardware thread, and which entries to allocate to each thread. The number of entries to allocate to each hardware thread may be based on, for example, the total number of entries in the STF, the number of blocks that make up the STF, the number of active hardware threads, and/or the number of architected registers needed for each hardware thread. Similarly, determining which entries to allocate to each hardware thread may be based on, for example, the number of entries allocated to each thread, the number of hardware threads, and the number of entries in each block of the STF.

In the example used throughout this disclosure, each thread needs 102 architected registers, and the STF is broken into four blocks that each have 90 entries. As such, each hardware thread receives a set of 26 entries from each STF block, for a total number of 104 architected registers. Because there are two hardware threads, the first hardware thread is given the first 26 entries in each STF block (shown as entries 0-25 in FIGS. 2A-2C and 4A-4B), and the second hardware thread is given the last 26 entries in each STF block (shown as entries 64-89 in FIGS. 2A-2C and 4A-4B). The remaining entries (26-63) do not include data for any hardware threads. It is to be noted, however, that this is simply an illustrative example, and other entries could have been assigned. For example, the second hardware thread could have been assigned entries 26-51, meaning that data for the hardware threads would be compacted into entries 0-51, and entries 52-89 would remain empty.

At operation 510, the STF data for the active hardware threads is compacted into the STF entries allocated to the respective hardware threads. This is done by performing a series of data move instructions to move data in the STF. For example, a free list is used to identify free (i.e., unallocated) STF entries. Then, an STF tag for a first hardware thread (being compacted into entries 0-25) is read. If the STF tag is in entries 0-25 of the STF already, no move operation is performed. However, if the STF tag is found elsewhere (e.g., in entry 45 of the STF), a move operation is performed to move the STF tag to an appropriate entry (e.g., the first free STF entry). This process may be repeated until all STF tags for each hardware thread is moved into one of the entries in the STF allocated to that hardware thread.

After the STF data has been compacted at operation 510, the method 500 proceeds in one of two ways depending on if the processor is in a core-split mode or not. As used herein, a core-split mode is a mode in which each superslice operates independently, and in which the STFs for different superslices do not have to match. If the processor is in a core-split mode ("Yes" at decision block 512), the method 500 ends. However, if the processor is not in a core-split mode ("No" at decision block 512), the method proceeds to operation 514.

At operation 514, the STFs are synchronized. In other words, the data is copied between the STFs such that each STF contains the STF tags for each hardware thread in the core, including the hardware threads that are found in other superslices. Once the data has been synchronized, the method 500 ends.

In some embodiments, various steps described herein as "determining" something may not involve computation to select between multiple options, but instead may simply describe how the processor is configured. For example, while operation 508 says to determine the compaction type, this does not necessarily involve an active step of computing or selecting from a set of potential compaction types. Instead, the processor may be configured (e.g., programmed or using hardware) to always perform a specific compaction type (e.g., vertical compaction).

Figure 6:
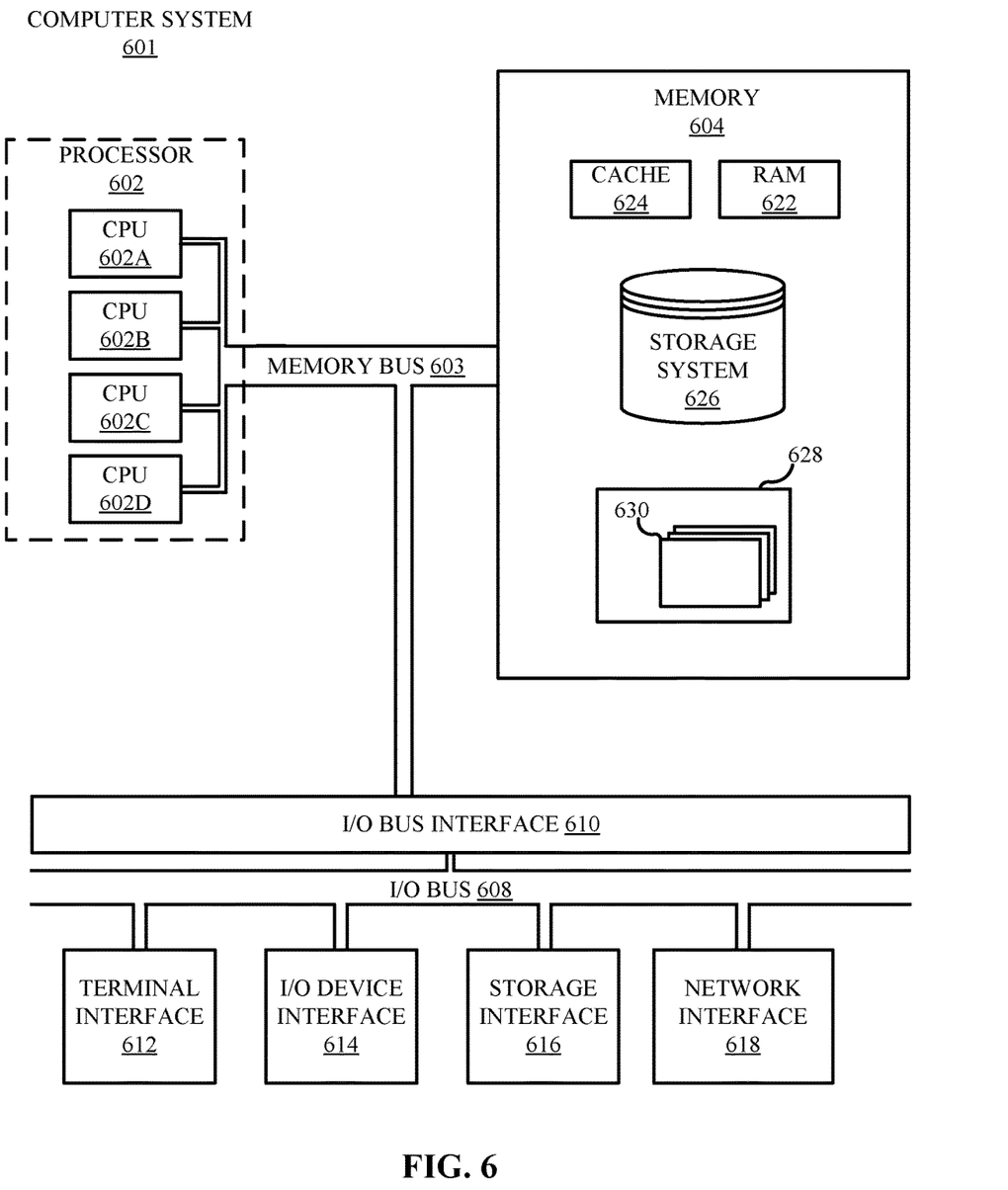
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments.

Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

What is claimed is:

1. A method comprising:
receiving an instruction to reconfigure a processor core from a first simultaneous multithreading (SMT) mode to a second SMT mode, wherein the second SMT mode includes fewer threads than the first SMT mode;
allocating a first set of entries in a first register file to a first hardware thread of the processor core;
allocating a second set of entries in a second register file to a second hardware thread of the processor core; and
compacting register data in the first and second register files, wherein register data associated with the first hardware thread is compacted into the first set of entries, and register data associated with the second hardware thread is compacted into the second set of entries,
wherein the allocating the first set of entries, the allocating the second set of entries, and the compacting are performed in response to receiving the instruction.

2. The method of claim 1, wherein the first and second register files are the same register file, and wherein register tag numbers of the first set of entries do not overlap with register tag numbers of the second set of entries.

3. The method of claim 1, wherein the first hardware thread is in a first superslice in the processor core, and wherein the second hardware thread is in a second superslice in the processor core.

4. The method of claim 1, wherein:
the first SMT mode is an SMT-4 mode;
the second SMT mode is an SMT-2 mode;
the first hardware thread is in a first superslice in the processor core;
the first superslice further comprises a third hardware thread when the processor core is operating in the SMT-4 mode;
the second hardware thread is in a second superslice in the processor core; and
the second superslice further comprises a fourth hardware thread when the processor core is operating in the SMT-4 mode.

5. The method of claim 4, wherein:
each of the first and second register files comprises a first slice target register file (STF) block and a second STF block;
the first set of entries includes all entries in the first STF block; and
the second set of entries includes all entries in the second STF block.

6. The method of claim 4, wherein each of the first and second register files comprises a first slice target register file (STF) block and a second STF block, and wherein compacting the register data in the first and second register files comprises:
compacting the register data associated with the first hardware thread into the first N entries in each of the first and second STF blocks of the first register file; and
compacting the register data associated with the second hardware thread into the last N entries in each of the first and second STF blocks of the second register file.

7. The method of claim 4, the method further comprising:
reconfiguring the processor core to run in the second SMT mode by deactivating the third hardware thread and the fourth hardware thread;
deallocating, from the first register file, a first set of register tags associated with the third hardware thread;
adding the first set of register tags to a free list for the first superslice;
deallocating from the second register file, a second set of register tags associated with the fourth hardware thread; and
adding the second set of register tags to a free list for the second superslice,
wherein the first and second sets of register tags are deallocated from the first and second register files before the compacting the register data in the first and second register files.

8. The method of claim 4, wherein the method further comprises:
synchronizing, after compacting the register data in the first and second register files, the first and second register files, wherein the synchronizing includes:
copying the register data associated with the first hardware thread into corresponding locations in the second register file; and
copying the register data associated with the second hardware thread into corresponding locations in the first register file.

9. A processor having one or more processor cores, the one or more processor cores comprising:
a first superslice comprising a first hardware thread, a third hardware thread, and a first slice target register file (STF) having a first set of STF blocks; and
a second superslice comprising a second hardware thread, a fourth hardware thread, and a second STF having a second set of STF blocks,
wherein the processor is configured to perform a method comprising:
receiving an instruction to reconfigure the processor from a first simultaneous multithreading (SMT) mode to a second SMT mode, wherein the second SMT mode includes fewer threads than the first SMT mode;
deactivating, in response to switching from the first SMT mode to the second SMT mode, the third and fourth hardware threads;
allocating a first set of entries of the first STF to the first hardware thread;
allocating a second set of entries of the second STF to the second hardware thread;
compacting STF data for the first hardware thread into the first set of entries of the first STF; and
compacting STF data for the second hardware thread into the second set of entries of the second STF,
wherein the allocating the first set of entries, the allocating the second set of entries, the compacting the STF data for the first hardware thread, and the compacting the STF data for the second hardware thread are performed in response to receiving the instruction.

10. The processor of claim 9, wherein the method further comprises:

deallocating, prior to compacting the STF data for the first and second hardware threads, STF tags associated with the third and fourth hardware threads.

11. The processor of claim 10, wherein deallocating the STF tags associated with the third and fourth hardware threads comprises:
removing the STF tags associated with the third hardware thread from the first STF;
adding the STF tags associated with the third hardware thread to a free list for the first superslice;
removing the STF tags associated with the fourth hardware thread from the second STF; and
adding the STF tags associated with the fourth hardware thread to a free list for the second superslice.

12. The processor of claim 9, wherein the first set of entries of the first STF is the first N entries in each STF block of the first set of STF blocks, and wherein the second set of entries of the second STF is the last N entries in each STF block of the second set of STF blocks.

13. The processor of claim 9, wherein the first set of entries of the first STF includes a first STF block of the first set of STF blocks but not a second STF block of the first set of STF blocks, and wherein the second set of entries of the second STF includes a second STF block of the second set of STF blocks but not a first STF block of the second set of STF blocks.

14. A computer program product comprising a computer readable storage medium having program instructions embodied therewith, the program instructions executable by a processor to cause the processor to perform a method comprising:
receiving a particular instruction to reconfigure a processor core from a first simultaneous multithreading (SMT) mode to a second SMT mode, wherein the second SMT mode includes fewer threads than the first SMT mode;
allocating a first set of entries in a first register file to a first hardware thread of the processor core;
allocating a second set of entries in a second register file to a second hardware thread of the processor core; and
compacting register data in the first and second register files, wherein register data associated with the first hardware thread is compacted into the first set of entries, and register data associated with the second hardware thread is compacted into the second set of entries,
wherein the allocating the first set of entries, the allocating the second set of entries, and the compacting are performed in response to receiving the particular instruction.

15. The computer program product of claim 14, wherein:
the first SMT mode is an SMT-4 mode;
the second SMT mode is an SMT-2 mode;
the first hardware thread is in a first superslice in the processor core;
the first superslice further comprises a third hardware thread when the processor core is operating in the SMT-4 mode;
the second hardware thread is in a second superslice in the processor core; and
the second superslice further comprises a fourth hardware thread when the processor core is operating in the SMT-4 mode.

16. The computer program product of claim 14, wherein the first and second register files are the same register file.

17. The computer program product of claim 14, wherein the first hardware thread is in a first superslice in the processor core, and wherein the second hardware thread is in a second superslice in the processor core.

* * * * *